United States Patent
Schroder et al.

(10) Patent No.: US 7,107,329 B1
(45) Date of Patent: Sep. 12, 2006

(54) IN NETWORKS OF INTERCONNECTED ROUTER NODES FOR ROUTING DATA TRAFFIC, A METHOD OF AND SYSTEM FOR IMPERCEPTIBLY UPGRADING ROUTER NODE SOFTWARE AND THE LIKE WITHOUT TRAFFIC INTERRUPTION

(75) Inventors: Kenneth J. Schroder, Waltham, MA (US); Glenn McGuire, Marlborough, MA (US); Zbigniew Opalka, Harvard, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/316,905

(22) Filed: May 21, 1999

(51) Int. Cl.
G06F 15/16 (2006.01)
(52) U.S. Cl. ............... 709/221; 709/230; 709/246; 712/15; 713/100; 717/120; 717/171
(58) Field of Classification Search ........ 709/221, 709/230, 246; 712/15; 713/100; 717/120, 717/165, 171
See application file for complete search history.

(56) References Cited

U.S. PATENT DOCUMENTS

| | | | | |
|---|---|---|---|---|
| 5,155,837 A | * | 10/1992 | Liu et al. ............ | 709/221 |
| 5,339,430 A | * | 8/1994 | Lundin et al. | |
| 5,418,524 A | * | 5/1995 | Fennell | |
| 5,546,581 A | * | 8/1996 | McKinnis et al. | |
| 5,546,584 A | * | 8/1996 | Lundin et al. | |
| 5,555,418 A | * | 9/1996 | Nilsson et al. | |
| 5,931,938 A | * | 8/1999 | Drogichen et al. ... | 712/15 |
| 5,968,170 A | * | 10/1999 | Gross et al. ......... | 713/100 |
| 6,009,524 A | * | 12/1999 | Olarig et al. | |
| 6,012,088 A | * | 1/2000 | Li et al. | |
| 6,026,157 A | * | 2/2000 | Gulik et al. | |
| 6,084,869 A | * | 7/2000 | Fishman et al. ...... | 370/348 |
| 6,101,327 A | * | 8/2000 | Holte-Rost et al. | |
| 6,125,372 A | * | 9/2000 | White | |
| 6,128,734 A | * | 10/2000 | Gross et al. ......... | 713/100 |
| 6,134,663 A | * | 10/2000 | Nakamura et al. | |
| 6,154,878 A | * | 11/2000 | Saboff ............. | 717/173 |
| 6,175,919 B1 | * | 1/2001 | Ha ................ | 713/100 |
| 6,195,792 B1 | * | 2/2001 | Turnbull et al. | |
| 6,202,207 B1 | * | 3/2001 | Donohue ........... | 709/221 |
| 6,289,511 B1 | * | 9/2001 | Hubinette | |
| 6,314,567 B1 | * | 11/2001 | Oberhauser et al. | |
| 6,324,693 B1 | * | 11/2001 | Broderson et al. | |
| 6,353,928 B1 | * | 3/2002 | Altberg et al. | |
| 6,360,363 B1 | * | 3/2002 | Moser et al. | |
| 6,378,127 B1 | * | 4/2002 | Delo | |
| 6,397,385 B1 | * | 5/2002 | Kravitz | |
| 6,408,434 B1 | * | 6/2002 | Fujiwara | |
| 6,418,555 B1 | * | 7/2002 | Mohammed | |
| 6,438,748 B1 | * | 8/2002 | Gard et al. ......... | 717/168 |
| 6,446,255 B1 | * | 9/2002 | Curtis et al. | |

(Continued)

OTHER PUBLICATIONS

Willis, RFC 1269, Network Working Group, Oct., 1991.*

(Continued)

*Primary Examiner*—Andrew Caldwell
*Assistant Examiner*—Stephan Willett

(57) ABSTRACT

In networks of interconnected router nodes for forwarding data traffic along a predetermined path of the network, a method of and system for imperceptibly upgrading router node software and the like without traffic interruption through a novel preparation of upgraded software in a router while that router continues to forward data under the control of its original software, and then swapping the upgraded software for the original software without disruption.

22 Claims, 4 Drawing Sheets

Figure 1A:
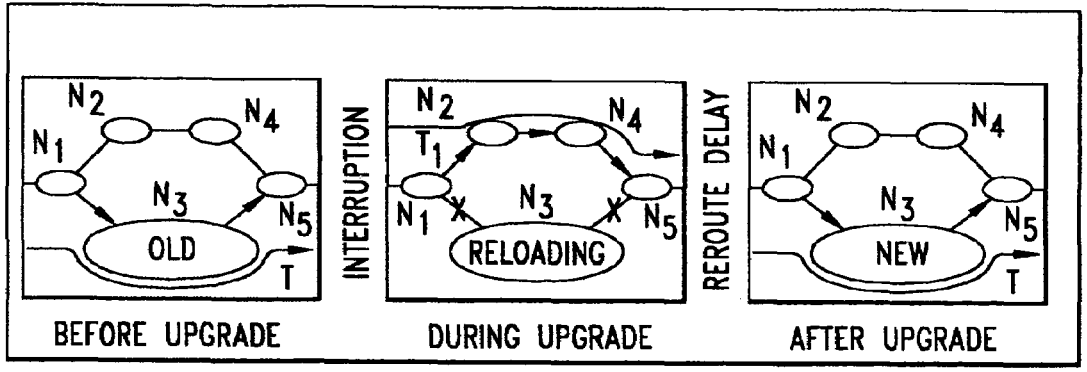

THE APPROACH DESCRIBED ALLOWS UPGRADES TO BE DONE WITHOUT INTERRUPTION. THIS APPLIES EVEN IF THERE IS NO ALTERNATE PATH AVAILABLE.

U.S. PATENT DOCUMENTS 6,463,584 B1 * 10/2002 Gard et al. .................. 717/171
6,473,899 B1 * 10/2002 Nelson et al. .............. 709/221
6,553,028 B1 *  4/2003 Tang et al. ................. 370/389
6,594,822 B1 *  7/2003 Schweitz et al. ........... 717/140
2001/0014968 A1 *  8/2001 Mohammed
2001/0049732 A1 * 12/2001 Raciborski et al.
2001/0053131 A1 * 12/2001 Geens
2002/0021675 A1 *  2/2002 Feldman

OTHER PUBLICATIONS

Rekhter, RFC 1772, Network Working Group, Mar., 1995.*
Manning, RFC 2042, Network Working Group, Jan., 1997.*

* cited by examiner

THE TRADITIONAL APPROACH INTERRUPTS SERVICE FOR UPGRADES. IF NO ALTERNATIVE PATH EXISTS, A PORTION OF THE NETWORK WILL BE DISCONNECTED DURING THE UPDATE.

THE APPROACH DESCRIBED ALLOWS UPGRADES TO BE DONE WITHOUT INTERRUPTION. THIS APPLIES EVEN IF THERE IS NO ALTERNATE PATH AVAILABLE.

IN NETWORKS OF INTERCONNECTED ROUTER NODES FOR ROUTING DATA TRAFFIC, A METHOD OF AND SYSTEM FOR IMPERCEPTIBLY UPGRADING ROUTER NODE SOFTWARE AND THE LIKE WITHOUT TRAFFIC INTERRUPTION

FIELD

The present invention relates to the routing of data traffic along a network comprised of interconnected successive router nodes, each controlled by its own software information processing tables and management protocol for enabling the data routing to the next router node and along the network routing path; the invention being more particularly directed to the impact upon the data routing of upgrading such software.

BACKGROUND

Under current practice, as in, for example, network routing systems of Cisco and other manufacturers, the upgrading, revising or other changing of the software managing of a router in such a network of interconnected router nodes requires taking the router down, effecting the software upgrade or other change (generally from software memory images), and then restarting, disrupting the routing traffic and interaction with neighboring router nodes. Historically, the problem of network routing reliability has often not been a large issue because of the redundancy of routing paths in the networks, and because of the tolerance of users to a half-minute to several minutes traffic re-routing after a particular router node has been taken out of service for a software upgrade, or has failed. The removal of a router node from the network triggers the reconverging along another path of router nodes. The router is brought down to the level of only configuration management while the software is upgraded or otherwise changed or varied, and then the router is restarted again and reconverges, enabling traffic along the initial router network path. If no alternative path exists, however, a portion of the network will be disconnected during the update.

In environments such as universities and the like, several minutes of disruption for email or the like is tolerable; but if audio or video data is being routed, or interactive interplay is involved, such reconfiguring time presents a deleterious disruption.

Through the novel techniques underlying the present invention, however, a much higher availability router is provided wherein software may be upgraded in the network router path without disrupting or interrupting traffic service therein, and without interruption even if no alternative routing paths are available in the network.

OBJECTS OF INVENTION

It is accordingly the principal object of the present invention to provide a new and improved method of and system for upgrading or otherwise changing or varying router software in networks of interconnected router nodes without suffering the before-described prior art traffic interruption and resulting delays and the like.

Another object is to provide for such upgrades without interruption even if there is no alternative routing path available in the network.

Still a further object is to provide a novel higher availability router system than prior art systems.

Other and further objects will be explained hereinafter and are more particularly delineated in the appended claims.

SUMMARY

In summary, however, from one of its viewpoints, the invention embraces in a network data routing system comprised of a plurality of interconnectable router nodes, each controlled by software processing and management information for enabling data routing along a predetermined path of router nodes, a method of revising and upgrading the software information in one of such preselected router nodes along said paths, that comprises, continuing the data routing along said path with original software information controlling said one router node; during such continued routing, preparing new software information at said one node from said original software information and including revisions and upgrades; and, after such preparing of the new software information, swapping the same for the original software information in said one node during the continuing of the data routing along said path without interruption, and imperceptibly to all the other router nodes in the router system.

Preferred and best mode designs and details are later fully described.

DRAWINGS

Figure 1B:
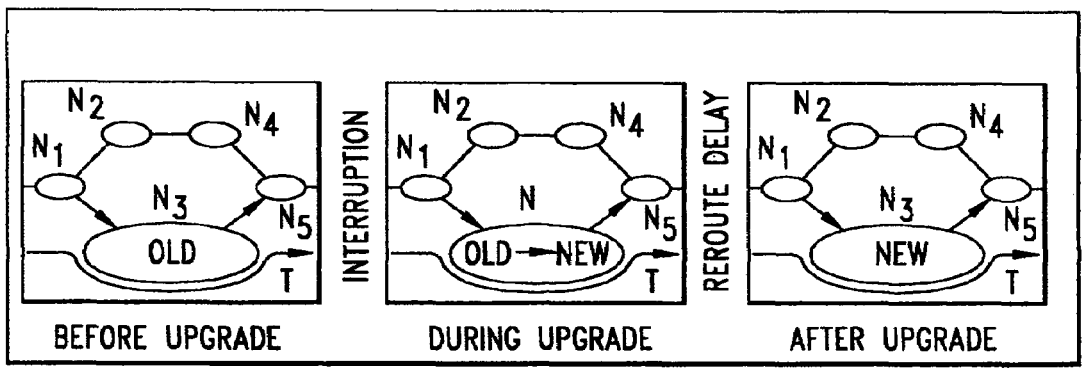
Figure 2:
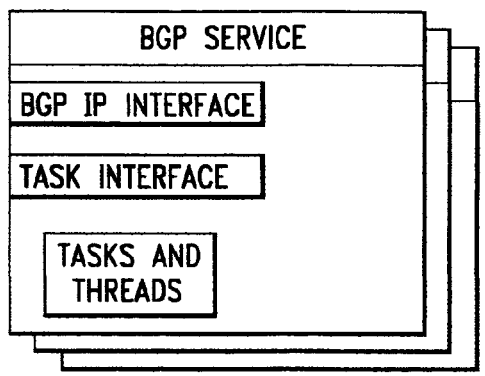
Figure 3:
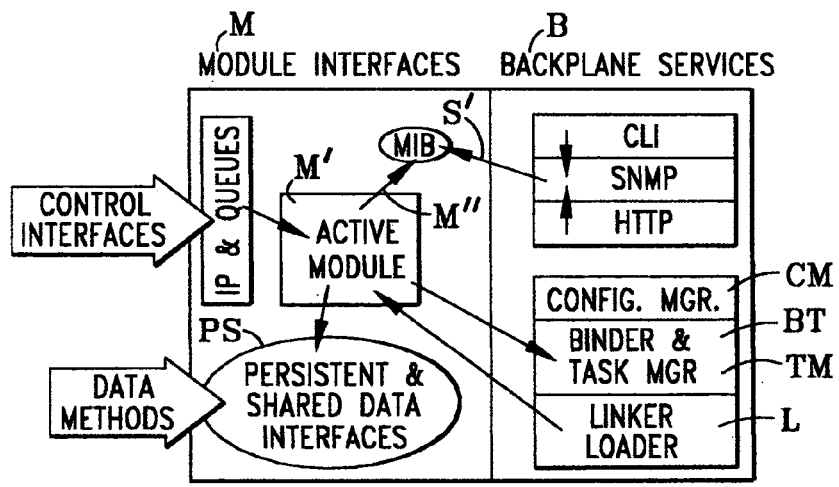
Figure 4:
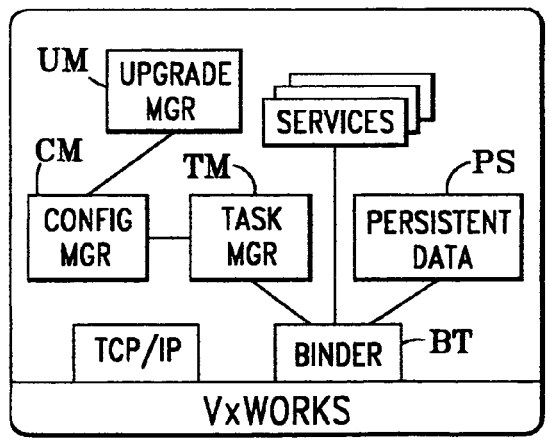
Figure 5:
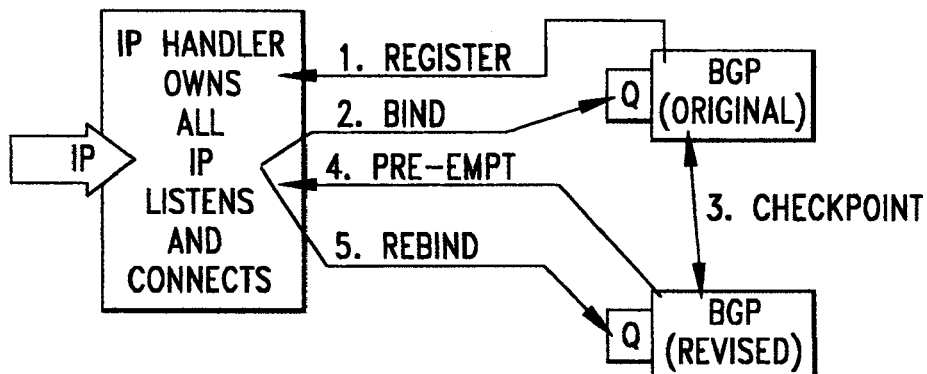
Figure 6:
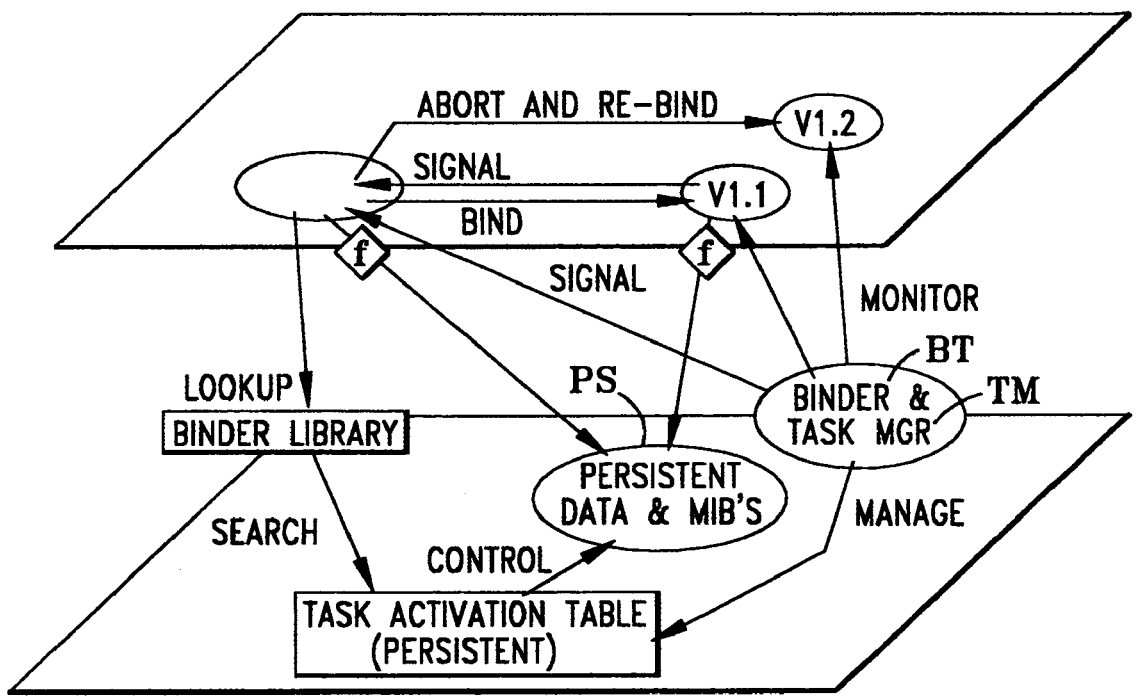
Figure 7:
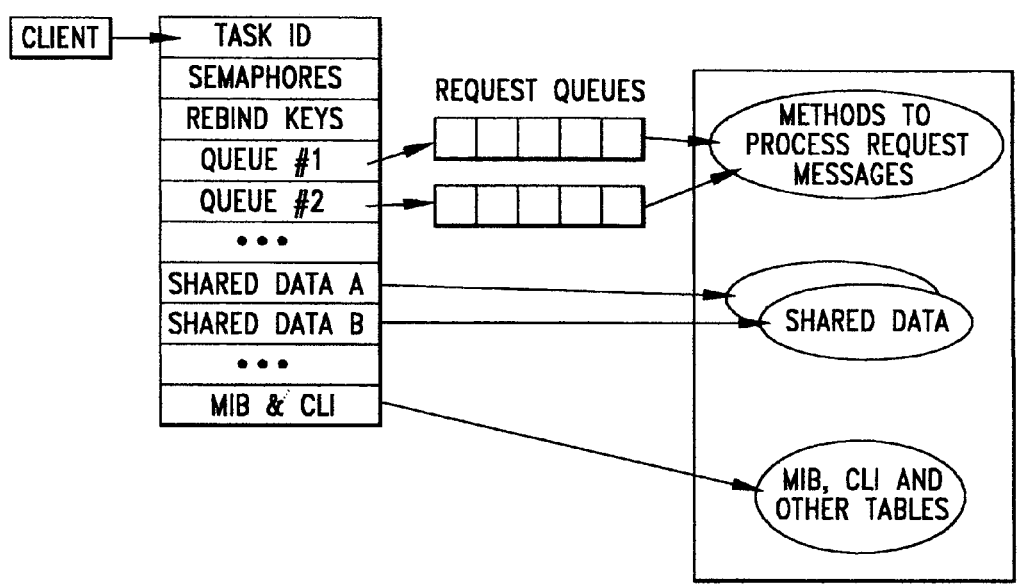

The invention will now be explained in connection with the accompanying drawings in which FIG. 1A is a conventional or traditional prior art schematic network routing system diagram illustrating the interruption of service for software upgrading and reloading;

FIG. 1B is a diagram of the contrasting technique of the present invention in preferred form for allowing such software upgrades (old to new software) without interruption, and even if no alternate network routing path is available—a so-called "hot swap" of software;

FIG. 2 is a diagram illustrative of the relationship of key module architectural elements in Border Gateway Protocol (BGP) support embodying well-known routing table data for controlling packet forwarding, FIG. 3 is a diagram explanatory of the "hot-swap" software backplane architecture for a Management Information Base (MIB) containing descriptions of all router configurations, protocols, addressees, etc., and with backplane Command Line Interpreter (CLI), Hyper Text Transfer Protocol (HTTP) and Simple Network Management Protocol (SNMP) used for remote management of the system, FIG. 4 illustrates suitable software "hot-swap" functional components, FIG. 5 shows the operation of the information processing (IP) handler in passing original to revised BGP;

FIG. 6 outlines the binding activity relationships and steps in the upgraded software taking over from and swapping with the original version; and FIG. 7 is a block interconnection diagram of key elements of the system interfacing structure.

DESCRIPTION OF PREFERRED EMBODIMENT(S) OF INVENTION

As before mentioned, the upgrading or other changing or varying of the software in any router of the plurality of successively interconnected routers defining the network data traffic path, is effected, in accordance with the present invention, without bringing the router down. Rather, the invention enables creating a swap of upgraded software, prepared while the original router software continues operation, without interruption of that router operation, and imperceptibly to all the other routers and system.

This, as earlier pointed out, is in distinct contrast to traditional techniques illustrated in FIG. 1A, wherein a pair of illustrative network paths of interconnected router nodes are respectively illustrated as the upper path $N_1$-$N_2$-$N_4$-$N_5$ and the lower path $N_1$-$N_3$-$N_5$ between an input terminal node $N_1$ and an output terminal mode $N_5$. The shortest and most desirable data traffic path is the lower path, where it will be assumed data packet traffic is accordingly routed along T.

When it becomes necessary to upgrade or change the software in router node $N_3$, the prior art, as previously noted, generally shuts down $N_3$ during the upgrading and re-loading of the software, indicated as by the crosses X. This requires the seeking of the alternative longer upper path $T^1$ ($N_1$-$N_2$-$N_4$-$N_5$) with the indicated interruption and re-route delay. Had there been no alternative path, moreover, the lower portion of the network would be disconnected during the update.

In contrast, as shown in FIG. 1(B), in accordance with the present invention, the upgraded software "New" is prepared from the "Old" within the router $N_3$ while it continues to operate in the lower path T, passing data packets between the terminal router nodes $N_{1\ and\ N5}$. Once the "New" software is ready, it is swapped for the "Old" during the continued operational routing along path T (hence "hot swap"), and without anything internal or external being disrupted or interrupted, and imperceptibly to all other router nodes in the system. The new software takes over without impacting the delivery of information in the network.

Preferred ways in which this "on-the-fly" or "on-line" preparation of upgraded software and "hot swap" may be implemented, will now be detailed with a description of the software functionality and architecture suitable for "hot-swap" capability, including the functional composition, the generic flow of information through the system that "hot swap" must support, and the functional requirements associated with each hot-swap support component.

First, the relationship of key module architectural elements is schematically shown in FIG. 2, using an example of the before-mentioned BGP routing table data packet forwarding support on a single router switch. Shown within the BGP service is its IP (Information Processing) interface and tasks and threads that send request messages to other services—tasks being active executable images that execute the code from a module, and threads being the concurrent lines of execution within a task, wherein activation of a service causes the tasks and threads to be started and the module code to begin executing the task.

The "hot-swap" architecture provides a sort of uniform "software backplane", FIG. 3, into which each service is connected, removed and replaced. This is accomplished through the following key interfaces. From left-to-right, three main stacks are shown: arrows representing control and data methods interfaces, so-labeled; the module interfaces M, wherein modules may be a routing application or a management interface to the system; and backplane services B with which the modules all interact and rely upon. The latter is illustrated as containing the before-mentioned Command Line Interpreter (CLI), Simple Network Management Protocol (SNMP), and Hyper Text Transfer Protocol (HTTP). The active module $M^1$ in the module interface section M provides the active software code for the upgrading. The persistent and shared data interfaces PS capture all the information, such as tables for application uses, data-bases that are to be retained, information about the current state of the programs, such as open connections or other system state information. These resources captured at PS must be persistent so that they can be passed from one application to another, and shared because sometimes more than one application may access that information. The previously mentioned Management Information Base (MIB) is the control interface to the active module $M^1$. The module informs the MIB (arrowed line M") of the ways in which it can be configured by the configuration manager CM, and the SNMP essentially sends requests (arrowed line $S^1$) by way of the MIB to the active module $M^1$, such as, for example, a request to enable.

Also within the backplane services B is provided a dynamic linker L that allows modules to be linked and then replaced with a link to a new version, and a dynamic binder BT that also allows a task to ask for other tasks by name, and receives a pointer to an interface structure that captures plug-in information; i.e. with a dynamically bound veneer to TCP/IP and message queue based IPC (so-labeled), allowing a new task to take control by the task manager TM of already open connections, and to pick up processing where the previous task left off. Thus, as above stated, the persistence mechanism PS allows state information to be passed from one task to the next, coordinating with the IP and messaging interface so that the point where the new task begins processing the queued requests, corresponds to the point the shared persistent data was check-pointed; and with the SNMP/MIB descriptors and data persisting between activation of the service.

FIG. 3 thus outlines the information of each application that is upgradable. In FIG. 4, the persistent data and services themselves comprising the software "hot-swap" functional components, are shown broken out into such components PS, BT, TM. CM, etc. earlier discussed in connection with FIG. 3. The operating system is designated Vx Works in FIG. 4, and the previously described binding dynamic linker is shown at BT for enabling loading in the code for the active modules for the different applications, and removing such when no longer required. The task manager TM controls the starting and stopping of the application and aspects of the choreography of handing off information from the old service to the new one during the software upgrade. TCP/IP represents the way of communicating with the other router nodes of the network and is part of the XWorks. The configuration manager CM deals with compatibility between different versions, and an upgrade manager UM controls the software modules coming in and out of the system; for example, taking an upgrade off a flash device or an Internet FTP server or from other places, and loading it into the system while ensuring it is all compatible.

In summary, therefore, in addition to the dynamic binding mechanisms, the task manager TM is responsible for activation of each required module, monitoring their availability and stopping a task or restarting the task if it has crashed. The use of module interfaces for the elements of the "hot-swap" services, focusing on the notion of the software backplane, provides a plug-in capability to each module. Such interfaces include the TCP/IP, UDP and task message IPC used to control a module. The interfaces also include the persistent data that must be passed from one activation of a task to the next in order to avoid any delay or disruption otherwise caused by a cold start of the module. The module interfaces include also the MIB used to represent the objects and information to be published through SNMP agent to a monitoring system. Support for this "backplane" also includes the embedded operating system which provides the usual range of well-known building blocks plus the linker, unlinker. Support may also include an additional library to support the dynamic binding among tasks, plus the configuration management services needed to maintain the software; and the network and system management interfaces, as well.

Turning now to the operating system features required to build on, and the changes needed to cause the TCP/IP stack to handle transparent module replacement, a more detailed description is herein provided of the modified TCP/IP stack and the elements required to support data persistence, the interface structure, and the binder and task manager; and finally, further description of the module management components, the configuration manager which allows an operator to control what will run and how the system will behave if new modules fail, and the download manager which oversees the software upgrades.

Reference is first made to FIG. 5, illustrating details of the IP handling in passing ownership from the "original" or old software to the "revised" or new upgraded version. As a result of the registration ("1. Register") of IP connections from BGP (original), the IP handler returns a binding ("2. Bind") that gives access to a set of resources, and at some point starting bindings to a set of IP connection resources ("5. Rebind") at the BGP (revised). After a leader time of running, the revised or new upgraded version BGP sends a message to the old software that BGP (revised) is taking over, causing the BGP to do a checkpoint ("3. Checkpoint"), assuring that it's at a stopping point; and, when it gets the go-ahead from the original, BGP (revised) pre-empts access to the handler resources ("4. Pre-empt"), and connections that were originally owned by the original or old BGP and preserved ("persistent"), are taken over by the new, with the process allowing reliable swapping from the old to the new without disruption in operation or service ("hot-swap") and imperceptibly to everything else in the network.

The IP handler bus allows connections, both listener and direct, to be passed from one task to another. Tasks will register with the service by identifying the port wish to listen for and that may include an identifier that will be included at the beginning of each message. When the connection is established, data from the connection will be passed to the appropriate message queue Q. Connect requests received in response to a proxy listen will also be sent to the message queue for accessing control checks the service may wish to perform. The connection can be reassigned when a new module begins to run and registers with the pre-empt option set. This will cause the old binding to be broken and a new one to be created, which may be nothing more than changing the task identifier associated with the binding held by the IP handler, since for proper handling, the entire message queue must be passed from the original task to the new one. Pending messages must be left on the queue for the new task to pick up and process. Before the new task may take the message queue for the old task, however, it may have to synchronize with the original task. This synchronization should ensure that all changes up to the last message process have been checkpointed to the persistent data area. It should also ensure that the original task does not begin to process additional messages beyond the synchronization point.

This approach is necessary to ensure a clean hand-off to pending work between tasks, since the message queues allow pending requests to be held and then redirected to a new version of the module. This approach is deemed a preferred one because it does not require modifications to TCP/IP stack. Such changes, indeed, would require a custom stack and would reduce the processing delay, buffer copy delay and possible memory fragmentation from buffer handling; but it would eliminate the more complicated problem of checkpoint synchronization with the message stream that must be performed for a clean hand-off between the tasks.

More fully to describe the binding activity relationship and steps, reference is now made to FIG. 6 where the old, or original or current running software version is labeled V1.1, and the newer revised or upgraded version is identified at V1.2. Basically, there are two sets of data in the general part of the system: one, the persistent data PS and MIBs, so-labeled, and the other, the task activation table (also so-labeled) that knows what is running in the system. The before-described task manager TM and the binder BT controls the context, with the binder dealing with what programs or versions are loaded into the system and runnable, and the task manager dealing with which particular version is running at a given point in time. It is also monitoring ("Monitor") this hand-off process indicated by the arrowed lines in the upper level of FIG. 6, where version V1.1 is sending a signal ("Signal") to get the binding ("Binding"), and the new version V1.2 aborts the original binding ("Abort and Rebind") and gets access to the resources in the lower level of the figure—all hidden from the external network. The previously mentioned use of a binder look-up library is also shown in FIG. 6.

Lastly, FIG. 7 illustrates how applications communicate and otherwise deal with one another by the novel generic module interface of the invention. Rather than making direct subroutine calls between applications which would be impractical with upgrading, and then going back and rebinding of the subroutine calls, the invention relies upon the sending of a message between the two applications, such that when a reply comes back, it simulates a subroutine call. Queues, so-labeled, are accordingly provided for that function. As previously described and also shown in FIG. 7, the MIB and CLI used for configuration are also message queues for the publishing to each application; for example, an MIB object set of a configuration parameters to be set, and the values wanted for setting them. Pointers are provided for owned data to be shared, also so-labeled, and managed and published to other applications. Tables that describe the supported MIB objects and the CLI commands are also provided (lower right of FIG. 7). Semaphores provide synchronization capabilities, with at least one of them providing a means for a thread to block while the associated service is an active or unplugged. The semaphore also provides the means for preventing a thread from being deactivated while the interface is in use. The structure, moreover, includes enough information to deal with rebinding to a new instance of the service, perhaps repeating information provided to the original bind. The set of message queues, furthermore, is used to interact with the service, being the mechanisms through which control requests are sent, and the module preferably also provides the library of functions for placing requests on the queues. The binder interface subroutine library (FIG. 6) can be called and to freely written in other tasks, allowing all bind calls to be made initially as part of a task start-up initialization code. As the main task for each upgradable module starts, it registers with the task manager, providing information as to how requests are received and processed, and initial configuration manager entry;

The task information may include:
Task-specific cut-over handling: drop pending input or accept
Network management MIBs, including data pointers
HTML or other interface definition hierarchy to be added to tree
Command line interface interpreter tables
Interface structures
Persistent and shared data pointers The task manager interface also provides;
A list of active tasks and module and version that each is running
Resource used by task (to the extent supported by VxWorks): processor and idle time, memory, I/O activity
State of the tasks: running, blocked or idle
Historical information: up-time, MIB-1 information The task manager may also maintain a watchdog timer of the various properties, and kill the task if the specified threshold is exceeded; for example, if a task is blocked with new requests pending for long period of time.

While the invention has been described in connection with the illustrative and important example of a BGP routing protocol, the techniques of the invention can also be applied to other routing protocols, link layer protocols, management applications and, in general, any application that runs on a router. Examples of routing protocols include interior gateway protocols, multicast protocols, resource reservation protocols. Link layer protocols include Frame Relay and ATM (A synchronous Transfer Mode) configuration, path selection and circuit management protocols. General management applications include Simple Network Management Protocol (SNMP), the command line interpreter, Web servers and other user interfaces and their supporting infrastructure within the router. General applications are wide ranging, including remote access protocols like tenet and ftp, information services for host name lookup and time synchronization, or embedded editors for modifying configuration and other files. The technique and portions thereof are useful in other communications systems as well; and further modifications will also occur to those skilled in the art, such being considered to fall within the spirit and scope of the invention as defined in the appended claims.

What is claimed is:

1. In a network data multiple routing system comprised of at least a pair of separate paths for routing data packets, each path containing one or more router nodes successively connected between input and output router nodes and with the input and output router nodes being common to each path, each router node being controlled by software processing and management information for routing the data packets along at least more than one of the paths between the input router node and the output terminal router nodes, a method of revising and upgrading the original software information in a preselected one of said router nodes along said paths that comprises, continuing the data packet routing along said paths between said router nodes with said original software information controlling said preselected router node; during such continued routing, preparing new software information within said preselected router node from said original software information and including revisions and upgrades while said preselected router node continues routing data packets between the nodes; and, after such preparing of the new software information within said preselected router node, swapping the new software information for the original software information in said preselected router node during its continuing of the data packet routing along said path without interruption and with the swapping effected imperceptibly to all router nodes between the input router node and the output terminal router node of the routing system.

2. The method of claim 1, wherein the original software package contains a border gateway protocol (BGP) for controlling data packet routing from said preselected one node along the network, and said preparing of the new software includes registering and binding the original software BGP information in a new software package during continued data packet routing through said preselected node under the original software BGP.

3. The method of claim 2 wherein said revisions and upgrades are also bound into said new software package.

4. The method of claim 3 wherein the original software package is signaled by the new software package when it is prepared to take over the software control of said preselected one node, and thereupon preemptively swaps with the original software package in said node without interruption.

5. The method of claim 4 wherein prior to the swap, the original software package checks and prepares for its disconnection at the time the new software package activates its swap connection.

6. A network data multiple routing system having, in combination, at least a pair of separate paths for routing data packets, each path containing one or more router nodes successively connected between input and output router nodes and with the input and output router nodes being common to each path, each router node being controlled by software processing and managing information for routing data packets along at least more than one of the paths between the input router node and the output terminal router nodes for the paths; apparatus for revising and upgrading the original software information in a preselected one of said router nodes along said paths comprising means operable during the continued data packet routing along said path between said router nodes for preparing new software information within said preselected router node from said original software information within said preselected router node and including revisions and upgrades, while said preselected router node continues routing data packets between the nodes; and, means operable after such preparing of the new software information within said preselected router node, for swapping the prepared new software information for the original software information in said preselected router node during the continuing of the data routing along said path without interruption, the swapping means enabling said swapping imperceptibly to all router nodes between the input router node and the output terminal router node of the routing system.

7. The system of claim 6 wherein the original software package contains a border gateway protocol (BGP) for controlling data packet routing from said preselected one node along the network, and said means for preparing said new software includes means for registering and binding original software BGP information in a new software package during continued data packet routing through said preselected node under the original software BGP.

8. The system of claim 7 wherein said binding means also binds the revisions and upgrades into said new software package.

9. The system of claim 8 wherein, means is provided for enabling the new software package to signal when it is prepared to take over the software control of said preselected one node, and means for thereupon preemptively swapping with the original software package in said node without interruption.

10. The system of claim 9 wherein, prior to the swap, means is provided for enabling the original software package to check and prepare for its disconnection at the time the new software package activates its swap connection.

11. The system of claim 10 wherein an IP handler for all IP is provided, interconnected with the original software package and the revised software package BGPs for controlling each of the registering, binding and preemptive swapping means.

12. The system of claim 11 wherein a software backplane architecture is provided for enabling the operation of the swapping means comprising three stacks: a control and data methods interface, active router module interfaces, and backplane services with which the modules interact and reply upon.

13. The system of claim 12 wherein the backplane services stack contains interacting command line interpreter (CLI), simple network management protocol (SNMP), and hypertext transfer protocol (HTTP) units.

14. The system of claim 13 wherein the active router module interface stack comprises, in addition to the module, a persistent and shared data interface receiving data from the module and from the data methods interface.

15. The system of claim 14 wherein the module is further connected to a management information base (MIB) serving as the control interface to the module, with the module informing the management information base of the ways in which it can be configured; and said backplane services stack further containing a configuration manager for such configuring.

16. The system of claim 15 wherein said management information base is connected to receive requests from said network management protocol unit for the module.

17. The system of claim 16 wherein the backplane services stack is also provided with a dynamic linker that is connected with the module to permit linking and then replacement with a link to a new version.

18. The system of claim 16 wherein the backplane services stack is further provided with a task manager for controlling the starting, stopping and handling of information from the old original software and the new upgrade software, and to allow a new task to take control of said task manager to pick up processing where the previous task left off.

19. The system of claim 18 wherein the backplane services stack is also provided with a dynamic binder that also allows a task to request other tasks and receives a pointer to an interface structure to capture information.

20. The system claimed in claim 19 wherein said persistent interface allows information on the system state to be passed from one task to the next, coordinating with IP and messaging interface so that the point where the new task begins processing queued requests, corresponds to the point where the shared persistent data is checkpointed, and with the SNMP/MIB descriptors and data persisting between activation of the service.

21. The system claimed in claim 19 wherein said task manager controls activation of each required module, monitors their availability, and stops a task or restarts the task if it has crashed.

22. The system claimed in claim 19 wherein a task activation table is provided that indicates what is running in the system, with said binder controlling what versions are loaded into the system and runnable, and with said task manager controlling which particular software version is running at a given time while monitoring the original and new software swapping.

* * * * *